United States Patent
Saiki et al.

(10) Patent No.: US 9,994,455 B2
(45) Date of Patent: Jun. 12, 2018

(54) APPARATUS AND METHOD FOR MANUFACTURING TRICHLOROSILANE AND METHOD FOR MANUFACTURING POLYCRYSTALLINE SILICON

(75) Inventors: Wataru Saiki, Hitachinaka (JP); Kazuki Mizushima, Omiya (JP); Makoto Urushihara, Nakagun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 418 days.

(21) Appl. No.: 12/451,666

(22) PCT Filed: May 23, 2008

(86) PCT No.: PCT/JP2008/059544
§ 371 (c)(1),
(2), (4) Date: Nov. 24, 2009

(87) PCT Pub. No.: WO2008/146741
PCT Pub. Date: Dec. 4, 2008

(65) Prior Publication Data
US 2010/0178230 A1 Jul. 15, 2010

(30) Foreign Application Priority Data

May 25, 2007 (JP) .................................. 2007-139111
May 14, 2008 (JP) .................................. 2008-127143

(51) Int. Cl.
*C01B 33/107* (2006.01)
*C01B 33/027* (2006.01)

(52) U.S. Cl.
CPC ........ *C01B 33/1071* (2013.01); *C01B 33/027* (2013.01)

(58) Field of Classification Search
CPC ... C01B 33/027; C01B 33/03; C01B 33/1071; C01B 33/10757

(Continued)

(56) References Cited

U.S. PATENT DOCUMENTS

| 4,165,363 A | 8/1979 | Weigert et al. |
| 4,217,334 A | 8/1980 | Weigert et al. |

(Continued)

FOREIGN PATENT DOCUMENTS

| CN | 1403372 A | 3/2003 |
| JP | 48-095396 A | 12/1973 |

(Continued)

OTHER PUBLICATIONS

Olsen, J. C. "Unit Processes and Principles of Chemical Engineering", 1932, pp. 1-3.*

(Continued)

*Primary Examiner* — Ngoc-Yen Nguyen
(74) *Attorney, Agent, or Firm* — Locke Lord LLP

(57) ABSTRACT

A method of manufacturing trichlorosilane includes a conversion reaction process (first reaction process) for producing a first reaction product gas, which contains trichlorosilane, dichlorosilylene, hydrogen chloride, and high-order silane compounds, by performing a conversion reaction of silicon tetrachloride and hydrogen, which are raw materials, in a first temperature range that is equal to or higher than 1000° C. and equal to or lower than 1900° C.; a first cooling process for cooling the first reaction product gas to a temperature of 950° C. or lower within 1 sec (except that the first reaction product gas is cooled to a temperature lower than 600° C. within 0.01 sec); a second reaction process for maintaining the temperature of the first reaction product gas in a second temperature range, which is equal to or higher than 600° C. and equal to or lower than 950° C., during the time that is equal to or more than 0.01 sec and equal to or less than 5 sec; and a second cooling process for cooling a second reaction product gas, which has been subjected to the second reaction process, to a temperature lower than 600° C.

7 Claims, 8 Drawing Sheets

(58) Field of Classification Search
USPC .................................................. 423/341, 342
See application file for complete search history.

(56) References Cited

U.S. PATENT DOCUMENTS

| | | | |
|---|---|---|---|
| 4,454,104 A | 6/1984 | Griesshammer et al. | |
| 5,063,040 A * | 11/1991 | Ruff .............................. | 423/342 |
| 5,422,088 A | 6/1995 | Burgie et al. | |
| 5,906,799 A | 5/1999 | Burgie et al. | |
| 2008/0112875 A1* | 5/2008 | Garcia-Alonso et al. .... | 423/342 |
| 2009/0285743 A1* | 11/2009 | Mizushima et al. .......... | 423/342 |
| 2009/0324477 A1* | 12/2009 | Mizushima et al. .......... | 423/342 |

FOREIGN PATENT DOCUMENTS

| | | |
|---|---|---|
| JP | 57-38524 | 8/1982 |
| JP | 57-156318 A | 9/1982 |
| JP | 60-081010 A | 5/1985 |
| JP | 61-063519 A | 4/1986 |
| JP | 62-021706 A | 1/1987 |
| JP | 3781439 | 10/1994 |
| JP | 07-232910 A | 9/1995 |
| WO | WO-2005/102928 A1 | 11/2005 |
| WO | WO 2006081980 A2 * | 8/2006 |

OTHER PUBLICATIONS

Translation of JP 60-081,010, May 1985.*
International Search Report dated Jul. 8, 2008, issued on PCT/JP2008/059544.
The extended European search report dated Jun. 11, 2015 issued for corresponding European Patent Application No. 08 76 4590.9.
Office Action dated Sep. 6, 2012, issued for the Chinese Patent Application No. 200880017383.6 and English translation thereof.

* cited by examiner

APPARATUS AND METHOD FOR MANUFACTURING TRICHLOROSILANE AND METHOD FOR MANUFACTURING POLYCRYSTALLINE SILICON

TECHNICAL FIELD

The present invention relates to an apparatus and method for manufacturing trichlorosilane that converts silicon tetrachloride and hydrogen to trichlorosilane by making silicon tetrachloride and hydrogen react with each other, and a method of manufacturing polycrystalline silicon that uses the trichlorosilane.

Priority is claimed on Japanese Patent Application No. 2007-139111, filed on May 25, 2007 and Japanese Patent Application No. 2008-127143, filed on May 14, 2008, the content of which is incorporated herein by reference.

BACKGROUND ART

It is possible to manufacture high-purity polycrystalline silicon by the hydrogen reduction reaction of trichlorosilane shown in the following reaction formula (1) and the thermal decomposition reaction of trichlorosilane shown in the following reaction formula (2) while using, for example, trichlorosilane ($SiHCl_3$: abbreviated as TCS), silicon tetrachloride ($SiCl_4$: abbreviated as STC) and hydrogen as raw materials.

$$SiHCl_3 + H_2 \rightarrow Si + 3HCl \tag{1}$$

$$4SiHCl_3 \rightarrow Si + 3SiCl_4 + 2H_2 \tag{2}$$

Trichlorosilane, which is a raw material of the above-mentioned manufacturing method, is produced by distilling and purifying crude trichlorosilane obtained by the reaction hydrogen chloride with metallurgical grade silicon. Further, it may be possible to produce trichlorosilane by a hydrogenation conversion reaction shown in the following reaction formula (3) while using silicon tetrachloride, which is recovered from an discharged gas of a polycrystalline silicon producing reaction through distillation and separation, as a raw material.

$$SiCl_4 + H_2 \rightarrow SiHCl_3 + HCl \tag{3}$$

For example, a conversion reaction apparatus (conversion furnace) disclosed in Patent Document 1 is known as an apparatus for manufacturing trichlorosilane. In the conversion reaction apparatus, a reaction chamber surrounded by heating elements includes double chambers (an inner chamber and an outer chamber) formed of two pipes that are concentrically arranged, a heat exchanger is provided at a lower portion of the reaction chamber, and a raw material gas supplying tube through which hydrogen and silicon tetrachloride are supplied and a discharge tube through which a reaction product gas is discharged from the reaction chamber are connected to the reaction chamber through the heat exchanger. In the heat exchanger, a feed gas supplied to the reaction chamber is preheated by heat transferred from a reaction product gas that is discharged from the reaction chamber, and the reaction product gas to be discharged is cooled.

Further, for example, Patent Document 2 proposes an apparatus. The apparatus includes a reaction chamber for obtaining a reaction product gas containing trichlorosilane and hydrogen chloride by introducing silicon tetrachloride and hydrogen to the reaction chamber and performing the conversion reaction of the silicon tetrachloride and hydrogen at a temperature of 600 to 1200° C., and a cooling device that rapidly cools the reaction product gas discharged from the reaction chamber, for example, at a cooling rate that makes the reaction product gas reach a temperature of 300° C. or lower within one second.

[Patent Document 1] Japanese Patent Publication No. 3781439

[Patent Document 2] Japanese Examined Patent Application Second Publication No. S57-38524

DISCLOSURE OF INVENTION

Problem that the Invention is to Solve

Meanwhile, in the apparatus for manufacturing trichlorosilane disclosed in Patent Document 1, the heat exchanger provided at the lower portion of the reaction chamber cools the reaction product gas by exchanging heat with the supplied raw material gas. However, while the reaction product gas is cooled, a reverse reaction of the reaction formula (3) where trichlorosilane reacts with hydrogen chloride and is decomposed into silicon tetrachloride (STC) and hydrogen is produced. Here, since the cooling rate of the cooling, which is performed by the heat exchanger in the prior art, is low, there have been disadvantages in that it is not possible to sufficiently suppress the occurrence of the reverse reaction and a conversion ratio to trichlorosilane deteriorates.

Further, as described in Patent Document 2, it may be possible to suppress the reverse reaction of the reaction formula (3) by rapidly cooling the reaction product gas to a temperature of 300° C. or lower in a very short time of 1 sec or less where the reverse reaction hardly occurs. However, there is known that $SiCl_2$ (dichlorosilylene) contained in the gas produced by the conversion reaction reacts with $SiCl_4$ and a polymer is generated as a by-product during the cooling as shown in, for example, the following reaction formula (4) when the reaction product gas is rapidly cooled as described above.

$SiCl_2$ (dichlorosilylene) is an intermediate product that is produced by the decomposition of trichlorosilane as shown in the following reaction formula (5). A large amount of $SiCl_2$ is produced in the conversion reaction under high temperature, and this is noticeable under a temperature that exceeds particularly 1200° C.

$$SiCl_2 + SiCl_4 \rightarrow Si_2Cl_6 \tag{4}$$

$$SiHCl_3 \rightarrow SiCl_2 + HCl \tag{5}$$

As described above, in the prior art, a conversion ratio of trichlorosilane deteriorates by the generation of a polymer as a by-product, and the generated polymer is attached to the wall of a pipe. Accordingly, there have been disadvantages in that the pipe may be clogged and it may not be possible to maintain a good state of the pipe and the like. Meanwhile, the polymer is a general name of high-order silane compounds such as $Si_3Cl_8$ (chlorotrisilane) and $Si_2H_2Cl_4$ that include two or more silicon atoms like $Si_2Cl_6$ (chlorodisilane).

The present invention has been made to solve the above-mentioned problems, and provides an apparatus and method for manufacturing trichlorosilane that can suppress the generation of a polymer, perform decomposition of the polymer, and improve conversion efficiency in a process for cooling gas produced by a conversion reaction, and a method of manufacturing polycrystalline silicon using trichlorosilane.

Means for Solving the Problem

The present invention relates to a method of manufacturing trichlorosilane that solves the above-mentioned problems by the following structure.

(1) A method for manufacturing trichlorosilane comprises, a conversion reaction process (first reaction process) for producing a first reaction product gas, which contains trichlorosilane, dichlorosilylene, hydrogen chloride, and high-order silane compounds, by performing a conversion reaction of silicon tetrachloride and hydrogen, which are raw materials, in a first temperature range which is equal to or higher than 1000° C. and equal to or lower than 1900° C., a first cooling process for cooling the first reaction product gas to a temperature of 950° C. or lower within 1 sec without cooling the first reaction product gas to a temperature lower than 600° C. within 0.01 sec, a second reaction process for maintaining the temperature of the first reaction product gas in a second temperature range, which is equal to or higher than 600° C. and equal to or lower than 950° C., during the time that is equal to or more than 0.01 sec and equal to or less than 5 sec, and a second cooling process for cooling a second reaction product gas, which has been subjected to the second reaction process, to a temperature lower than 600° C.

The method according to the present invention includes the following aspects.

(2) In the method according to (1), in the second reaction process, the reaction product gas subjected to the first cooling is maintained in the second temperature range at a cooling rate which is different from a first cooling rate.

(3) In the method according to (1) or (2), in the second reaction process, the first reaction product gas subjected to the first cooling is maintained in the second temperature range during the time which is equal to or more than 0.1 sec and equal to or less than 5 sec.

(4) In the method according to any one of (1) to (3), in the first cooling process, the first reaction product gas is cooled to a temperature of 950° C. or lower within 0.5 sec.

(5) In the method according to any one of (1) to (4), in the first cooling process, at least one of silicon tetrachloride and hydrogen is mixed with the first reaction product gas.

(6) In the method according to any one of (1) to (5), in the second reaction process, hydrogen chloride is mixed with the first reaction product gas (7) In the method according to any one of (1) to (6), in the second cooling process, hydrogen chloride is mixed with the second reaction product gas in a temperature range which is equal to or higher than 350° C.

(8) In the method according to any one of (1) to (7), in at least one of the first cooling process, the second reaction process, and the second cooling process, cooling is performed by heat exchange using at least one of silicon tetrachloride and hydrogen which are raw materials.

(9) A method of manufacturing polycrystalline silicon using trichlorosilane, which is manufactured by the method according to any one of (1) to (8), as one of the raw materials thereof.

The present invention relates to an apparatus for manufacturing trichlorosilane that includes the following structure.

(10) An apparatus for manufacturing trichlorosilane comprises, a conversion reactor (first reactor) for producing a first reaction product gas, which contains trichlorosilane, dichlorosilylene, hydrogen chloride, and high-order silane compounds, by performing a conversion reaction of silicon tetrachloride and hydrogen, which are raw materials, in a first temperature range that is equal to or higher than 1000° C. and equal to or lower than 1900° C., a first cooler for cooling the first reaction product gas to a temperature of 950° C. or lower within 1 sec without cooling the first reaction product gas to a temperature lower than 600° C. within 0.01 sec, a second reactor for maintaining the temperature of the first reaction product gas in a second temperature range, which is equal to or higher than 600° C. and equal to or lower than 950° C., during a time that is equal to or more than 0.01 sec and equal to or less than 5 sec, and a second cooler for cooling a second reaction product gas, which has been subjected to a second reaction process, to a temperature lower than 600° C.

The apparatus for manufacturing trichlorosilane according to the present invention includes the following aspects.

(11) In the apparatus according to (10), the first cooler cools the first reaction product gas to a temperature of 950° C. or lower within 0.5 sec.

(12) In the apparatus according to (10) or (11), the second reactor maintains the temperature of the reaction product gas, which has been subjected to the first cooling, in the second temperature range at a cooling rate that is different from a first cooling rate.

(13) In the apparatus according to any one of (10) to (12), the first cooler includes a mixture device that mixes at least one of silicon tetrachloride and hydrogen with the first reaction product gas.

(14) In the apparatus according to any one of (10) to (13), the second reactor includes a mixture device that mixes hydrogen chloride with a second reaction gas.

(15) In the apparatus according to any one of (10) to (14), the second cooler includes a mixture device that mixes hydrogen chloride with the second reaction product gas in a temperature range equal to or higher than 350° C.

(16) In the apparatus according to any one of (10) to (15), at least one of the first cooler, the second reactor, and the second cooler is a heat exchanger which performs heat exchange by using at least one of silicon tetrachloride and hydrogen which are raw materials.

In the apparatus and method for manufacturing trichlorosilane according to the present invention, the first reaction product gas produced in the conversion reaction process (first reaction process) is cooled to a temperature of 950° C. or lower within 1 sec, preferably, within 0.5 sec (first cooling process). Accordingly, it may be possible to suppress the decomposition of trichlorosilane (the reverse reaction of the conversion reaction) by rapid cooling. Further, the first reaction product gas is maintained in a second temperature range, which is equal to or higher than 600° C. and equal to or lower than 950° C., during a time that is equal to or more than 0.01 sec and equal to or less than 5 sec, preferably, during the time that is equal to or more than 0.1 sec and equal to or less than 5 sec (second reaction process). Accordingly, it may be possible to decompose a high-order silane compound by producing trichlorosilane from $SiCl_2$ (dichlorosilylene) in the second temperature range.

That is, in the apparatus and method for manufacturing trichlorosilane according to the present invention, the reverse reaction of trichlorosilane is suppressed in the first cooling process, so that the change of $SiCl_2$ to the polymer is suppressed. Further, trichlorosilane is more predominately produced than a polymer in the second reaction process, so that it may be possible to increase the amount of produced trichlorosilane.

It is preferable that the second reaction process (second reactor) of the apparatus and method for manufacturing trichlorosilane according to the present invention maintain the reaction product gas, which has been subjected to the first cooling, in the second temperature range at a cooling rate that is different from a first cooling rate. Further, it is preferable that the first reaction product gas be cooled to a temperature of 950° C. or lower within 0.5 sec in the first cooling process. By the first cooling and second reaction processes, it may be possible to sufficiently secure the time for the production of trichlorosilane from $SiCl_2$, to suppress the decomposition of trichlorosilane, to increase the amount of trichlorosilane contained in the second reaction product gas, and to make the second reaction product gas not substantially include a polymer.

In the apparatus and method for manufacturing trichlorosilane according to the present invention, it may be possible to further improve an effect for suppressing the decomposition of trichlorosilane and the production of trichlorosilane from $SiCl_2$, preferably, by mixing at least one of silicon tetrachloride and hydrogen with the first reaction product gas in the first cooling process, mixing hydrogen chloride with the first reaction product gas in the second reaction process, or mixing hydrogen chloride with the second reaction product gas in a temperature range of 350° C. or higher in the second cooling process.

As described above, in the apparatus and method for manufacturing trichlorosilane according to the present invention, the polymer contained in the produced gas is decomposed by the first cooling process and the second reaction process, so that the second reaction product gas, which does not substantially include a polymer, is produced. Accordingly, the cooling does not need to be performed at a higher cooling rate in the second cooling process, so that it may be possible to perform cooling at an arbitrary rate.

In the apparatus and method for manufacturing trichlorosilane according to the present invention, it may be possible to recover heat for the preheating of the raw materials and to reduce energy consumption, preferably, by cooling the first reaction product gas or second reaction product gas through the heat exchange using at least one of silicon tetrachloride and hydrogen, which are raw materials, in at least one of the first cooling process, the second reaction process, and the second cooling process.

Advantage of the Invention

According to the apparatus and method for manufacturing trichlorosilane of the present invention, by a first cooling process and a second reaction process, a reverse reaction of a conversion reaction is suppressed by a first cooling process and a second reaction process, and it may be possible to produce trichlorosilane from $SiCl_2$ and to decompose high-order silane compounds. Accordingly, the reverse reaction of the conversion reaction and the production of a polymer as a by-product are suppressed, so that it may be possible to increase the amount of produced trichlorosilane and to obtain trichlorosilane at a high conversion ratio. Further, since a second reaction product gas to be finally obtained does not substantially contain a polymer, it may be possible to reduce a problem that materials are attached to a pipe and to maintain the soundness of an apparatus.

DESCRIPTION OF REFERENCE NUMERALS AND SIGNS

1: APPARATUS FOR MANUFACTURING TRICHLOROSILANE
2: FIRST REACTOR (CONVERSION REACTOR)
3: FIRST COOLER
4: SECOND COOLER
5: SUPPLY MECHANISM
6: SUPPLY MECHANISM
7: SUPPLY MECHANISM
23: COOLING REACTION UNIT
23A: FIRST COOLER
23B: SECOND REACTOR
24: INTRODUCTION MECHANISM
43: COOLING REACTION UNIT
43A: FIRST COOLER

BEST MODE FOR CARRYING OUT THE INVENTION

An apparatus and method for manufacturing trichlorosilane according to the present invention will be described in detail with reference to embodiments shown in FIGS. 1 to 8. Meanwhile, in the following description, a first reactor may be referred to as a conversion reactor and a second reactor may be referred to as a maintaining part.

A method of manufacturing trichlorosilane according to the present invention includes a conversion reaction process (first reaction process) for producing a first reaction product gas, which contains trichlorosilane, dichlorosilylene, hydrogen chloride, and high-order silane compounds, by performing a conversion reaction of silicon tetrachloride and hydrogen, which are raw materials, in a first temperature range that is equal to or higher than 1000° C. and equal to or lower than 1900° C., a first cooling process for cooling the first reaction product gas to a temperature of 950° C. or lower within 1 sec without cooling the first reaction product gas to a temperature lower than 600° C. within 0.01 sec, a second reaction process for maintaining the temperature of the first reaction product gas in a second temperature range, which is equal to or higher than 600° C. and equal to or lower than 950° C., during the time that is equal to or more than 0.01 sec and equal to or less than 5 sec; and a second cooling process for cooling a second reaction product gas, which has been subjected to the second reaction process, to a temperature lower than 600° C.

Figure 1:
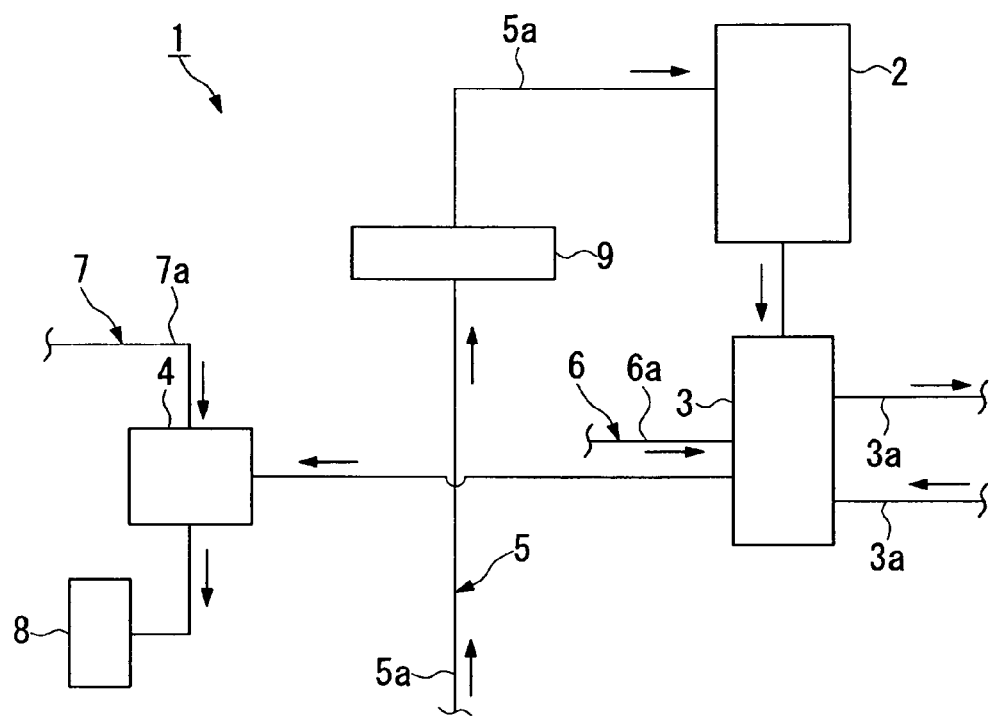
FIG. 1 is a view showing a process for manufacturing trichlorosilane according to the present invention.

FIG. 1 shows a specific example of a process for manufacturing trichlorosilane according to the present invention. As shown in FIG. 1, an apparatus 1 for manufacturing trichlorosilane according to the present invention includes a first reactor 2 (conversion reactor 2), a first cooler 3, a second reactor, and a second cooler 4: The first reactor 2 produces a first reaction product gas by a reaction between silicon tetrachloride ($SiCl_4$) and hydrogen that are raw materials. The first cooler 3 cools the first reaction product gas that is discharged from the first reactor 2. The second reactor maintains the first reaction product gas, which has been subjected to first cooling, in a second temperature range, which is equal to or higher than 600° C. and equal to or lower than 950° C., during a time that is equal to or more than 0.01 sec and equal to or less than 5 sec. The second cooler 4 cools a second reaction product gas, which has flown out from the second reactor, to a temperature lower than 600° C. Meanwhile, in the example of the process of FIG. 1, the first cooler 3 is also used as a second reactor.

A pipe 5a of a mechanism 5, which supplies a raw material gas, is connected to the first reactor 2 (conversion reactor 2). A pipe 6a of a mechanism 6, which supplies at least one of silicon tetrachloride and hydrogen, is connected to the first cooler 3. A pipe 7a of a mechanism 7, which introduces hydrogen chloride, is connected to the second cooler 4. In addition, a distillation device 8, which condenses and collects trichlorosilane from a cooled second reaction product gas, is connected to the second cooler 4.

[Conversion Reaction Process]

Feed gases, which contain silicon tetrachloride and hydrogen that are raw materials, are introduced to the first reactor 2 through the pipe 5a. Disilane may be contained in the supplied silicon tetrachloride that is a raw material, and may be removed from the supplied silicon tetrachloride. The first reactor 2 is heated up to a temperature that is equal to or higher than 1000° C. and equal to or lower than 1900° C. (first temperature range) and the supplied raw material gases react with each other, so that there is produced a first reaction product gas that contains trichlorosilane, dichlorosilylene, hydrogen chloride, and a high-order silane compound (first reaction process).

If the heating temperature of the first reactor 2 is lower than 1000° C., there are disadvantages in that a conversion ratio or a conversion rate is decreased and the size of the apparatus is increased. Further, if the heating temperature of the first reactor 2 exceeds 1900° C., a conversion ratio is not improved and the apparatus is not economical as a production facility.

Figure 3:
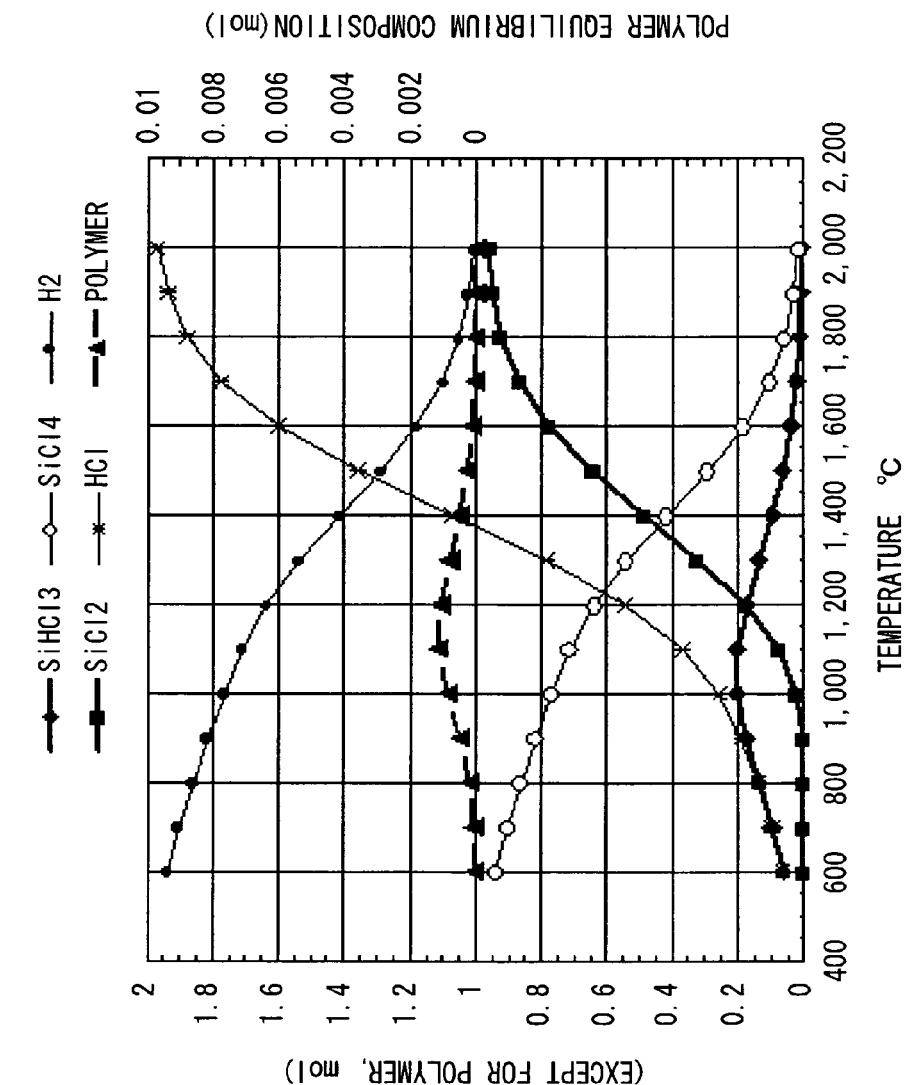
FIG. 3 is a graph showing an example (equilibrium value) of the composition of a reaction product gas with respect to temperature in a conversion reaction process (first reaction process) of the present invention.

FIG. 3 is a graph showing an example (equilibrium value) of the composition of a reaction product gas with respect to reaction temperature in a conversion reaction process. As shown in FIG. 3, the gas produced by a conversion reaction contains by-products, such as unreacted $H_2$, unreacted $SiCl_4$, HCl, $SiCl_2$, and polymers, together with trichlorosilane that is an objective product.

As shown in the graph of FIG. 3, the amount of converted $SiCl_4$ (the amount of reduced $SiCl_4$) in the conversion reaction is increased with temperature. Accordingly, it is preferable that the reaction temperature of the conversion reaction be high, and it is more preferable that the reaction temperature be 1100° C. or more where the conversion to $SiHCl_3$ approaches the maximum value and the conversion to $SiCl_2$ becomes significant. Meanwhile, as the reaction temperature of the conversion reaction rises, the reaction rate of decomposition of trichlorosilane (a reverse reaction of the reaction formula (3)) in a subsequent first cooling process is also increased. For this reason, even though an effect for suppressing the decomposition of trichlorosilane in the first cooling process is decreased and the large amount of converted $SiCl_4$ is thus obtained in the conversion reaction process, the amount of converted $SiCl_4$, which is finally obtained from the first and second cooling processes, is not increased as much as the amount of converted $SiCl_4$ obtained in the conversion reaction process. Accordingly, in order to obtain a large amount of converted $SiCl_4$ after cooling by a sufficient rapid-cooling effect in the first cooling process, it is preferable that the reaction temperature of an initial conversion process be 1300° C. or lower. From the above description, it is preferable that the reaction temperature of the conversion reaction process (first reaction process) be equal to or higher than 1100° C. and equal to or lower than 1300° C.

[First Cooling Process]

The first reaction product gas, which is produced in the conversion reactor 2 (first reactor 2), is introduced to the first cooler 3 and cooled to a temperature of 950° C. or lower within 1 sec. However, there is excluded a case where the first reaction product gas is cooled to a temperature lower than 600° C. within 0.01 sec. In a temperature range that is equal to or lower than 950° C., the decomposition of trichlorosilane (a reverse reaction of the reaction formula (3)) is hardly performed and a polymer is hardly produced from $SiCl_2$ (dichlorosilylene). Accordingly, the decomposition of trichlorosilane and the change of $SiCl_2$ to a polymer are suppressed by rapidly cooling the high-temperature first reaction product gas to a temperature of 950° C. or lower within 1 sec.

Meanwhile, if the first reaction product gas is rapidly cooled to a temperature lower than 600° C. during a time shorter than 0.01 sec, a reaction to trichlorosilane from $SiCl_2$ is not sufficiently performed and $SiCl_2$ is brought up to the second temperature range in a nonequilibrium state, so that a polymer producing reaction is easily performed. As a result, there are disadvantages in that the amount of produced trichlorosilane is reduced and the amount of a produced polymer of which the handling is troublesome is increased. In addition, time is taken to decompose a polymer and the size of the apparatus is increased, which is not economical. Meanwhile, if the cooling temperature of the first reaction product gas is higher than 950° C., trichlorosilane is easily decomposed. Accordingly, the amount of trichlorosilane produced is reduced.

Further, if the time required to cool the first reaction product gas to a temperature of 950° C. or lower exceeds 1 sec, the decomposition of trichlorosilane is performed during the cooling of the first reaction product. Accordingly, the amount of produced trichlorosilane is reduced. Meanwhile, in order to sufficiently secure a second reaction process of the second temperature range (which is equal to or higher than 600° C. and equal to or lower than 950° C.) after the first cooling process, it is preferable that the time required to cool the first reaction product gas to a temperature of 950° C. or lower be 0.5 sec or less.

In the first cooling process, at least one of silicon tetrachloride ($SiCl_4$) and hydrogen may be introduced to the first cooler 3 through the supply mechanism 6. It may be possible to suppress the decomposition of trichlorosilane by increasing the concentration of $SiCl_4$ and $H_2$ of the first reaction product gas. Assuming that the molar amount of $SiCl_4$ supplied in the conversion process is 1, it is preferable that the amount of each of the introduced $SiCl_4$ and $H_2$ be equal to or higher than 0.01 and equal to or lower than 10 in molar ratio. If the amount of each of the introduced $SiCl_4$ and $H_2$ is less than 0.01, the amount of trichlorosilane increased by the introduction thereof is small. Even though the amount of each of the introduced $SiCl_4$ and $H_2$ exceeds 10, the amount of increased trichlorosilane is not significantly changed. Accordingly, it is not economical. In the first cooling process, $SiCl_4$ and/or $H_2$ are introduced to cool the first reaction product gas to the temperature range. Accordingly, it may be possible to facilitate the production of trichlorosilane by effectively using reaction heat that is generated when trichlorosilane is produced from $SiCl_2$ and HCl.

[Second Reaction Process]

After the first cooling process, the first reaction product gas is maintained in the second temperature range (which is equal to or higher than 600° C. and equal to or lower than 950° C.) during a time that is equal to or more than 0.01 sec and equal to or less than 5 sec. In the second temperature range, as shown in the following reaction formula (6), $SiCl_2$ predominately produces trichlorosilane by reacting more with HCl than becoming a polymer. Accordingly, it may be possible to increase the amount of produced trichlorosilane.

$$SiCl_2 + HCl \rightarrow SiHCl_3 \quad (6)$$

In addition, a polymer such as $Si_2Cl_6$ that is produced as a by-product in the conversion reaction, and a polymer that is produced in a small amount during the first cooling process react with hydrogen chloride of the reaction product gas in a relatively short time as shown in the following reaction formula (7) by maintaining the temperature of the first reaction product gas, which has been subjected to first cooling, in the second temperature range. Accordingly, the polymers can be decomposed into trichlorosilane or silicon tetrachloride.

$$Si_2Cl_6 + HCl \rightarrow SiHCl_3 + SiCl_4 \quad (7)$$

It is appropriate that the time to maintain the first reaction product gas in the second temperature range is equal to or more than 0.01 sec and equal to or less than 5 sec, and it is preferable that the time be equal to or more than 0.1 sec and equal to or less than 5 sec. If the maintaining time is shorter than 0.01 sec, a sufficient effect cannot be obtained. Meanwhile, if the maintaining time is longer than 5 sec, the size of the apparatus is increased, which is not economical.

It is preferable that a cooling rate of the second reaction process be different from a first cooling rate and the two different rates intersect at a point of inflection. Here, "a cooling rate of the second reaction process is different from a first cooling rate and the two different rates intersect at a point of inflection," means that the change of the cooling rate of the first cooling process is not directly continued to the cooling rate of the second reaction process, gas temperature is changed from the first cooling process to the second reaction process after an inflection point, for example, as shown by Examples 1 to 7 of FIG. 7 (temperature change graph), and the cooling rate is switched. Meanwhile, in the cases of Examples 1 to 3 of FIG. 7, in the second reaction process, the reaction product gas is maintained in a temperature range, which is lower than the cooling temperature that is obtained by the first cooling by about −50° C., for 0.01 sec or more.

Since the cooling rate of the second reaction process is different from the first cooling rate and the two different rates intersect at a point of inflection, it may be possible to maintain the temperature of the reaction gas for a sufficient amount of time, which has been subjected to first cooling, in the second temperature range (which is equal to or higher than 600° C. and equal to or lower than 950° C.), and it may be possible to facilitate the production of trichlorosilane caused by the reaction between $SiCl_2$ and HCl shown in the reaction formula (6) and the decomposition of the polymer shown in the reaction formula (7).

It may be possible to further facilitate the production of trichlorosilane, which is caused by the decomposition of the polymer, by introducing hydrogen chloride to the second reactor (maintaining part) in the second reaction process. Assuming that the molar amount of $SiCl_4$ supplied in the conversion reaction is 1, it is preferable that the amount of introduced hydrogen chloride be equal to or higher than 0.01 and equal to or lower than 10. If the amount of introduced hydrogen chloride is less than 0.01, an effect of the polymer on the decomposition reaction, which is caused by the introduction thereof, is small. Even though the amount of introduced hydrogen chloride exceeds 10, an effect on the decomposition reaction is not increased. Accordingly, this is not economical.

The amount of produced trichlorosilane is increased by the first cooling process and the second reaction process, so that the first reaction product gas becomes the second reaction product gas that does not substantially contain a polymer. The second reaction product gas, which has been subjected to the second reaction process, is introduced to the second cooler 4 and cooled to a temperature lower than 600° C., specifically, lower than, for example, 300° C. (second cooling process).

The cooling rate of the second cooling process may be set to a cooling rate that is different from the second reaction process. It may be possible to facilitate the production of trichlorosilane, which is caused by the decomposition of the polymer, by introducing hydrogen chloride to the second reaction product gas of the second cooler 4 in the temperature range, which is equal to or higher than 350° C., through the pipe 7a of the supply mechanism 7 in the second cooling process. Assuming that the molar amount of $SiCl_4$ supplied in the conversion reaction is 1, it is preferable that the amount (in molar ratio) of introduced hydrogen chloride be equal to or higher than 0.01 and equal to or lower than 10. If the amount of introduced hydrogen chloride is less than 0.01, an effect of the polymer on the decomposition reaction, which is caused by the introduction thereof, is small. Even though the amount of introduced hydrogen chloride exceeds 10, an effect on the decomposition reaction is not increased. Accordingly, this is not economical.

The second reaction product gas, which has been cooled by the second cooler 4, is sent to the distillation device 8, so that trichlorosilane is condensed and collected. The recovered trichlorosilane is sent to a reaction apparatus that manufactures polycrystalline silicon, and may be used as one of the raw material of polycrystalline silicon.

In at least one of the first cooling process, the second reaction process, and the second cooling process of the apparatus and method for manufacturing trichlorosilane according to the present invention, the first or second reaction product gas is cooled by performing the heat exchange using at least one of silicon tetrachloride and hydrogen that are raw materials. Accordingly, it may be possible to recover heat for preheating the raw materials and to reduce energy consumption.

FIGS. 2 and 4 to 6 show an example of the configuration from the first reaction process (conversion reaction process) to the second cooling process for the apparatus and method for manufacturing trichlorosilane according to the present invention.

Figure 2:
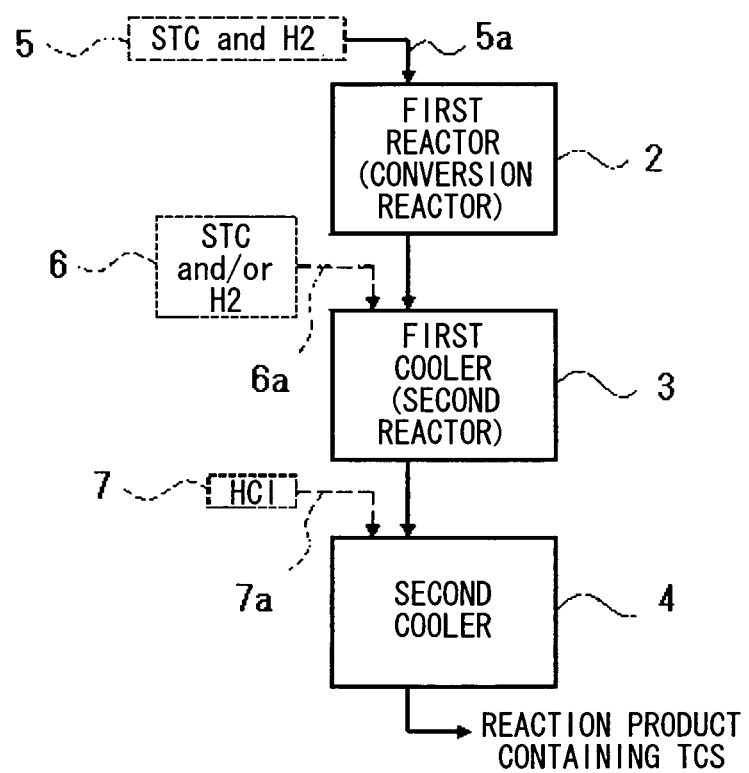
FIG. 2 is a view showing the configuration of main parts of a first embodiment according to the present invention.

A first embodiment is shown in FIG. 2. Like the embodiment shown in FIG. 1, an apparatus 1 for manufacturing trichlorosilane according to this embodiment includes a first reactor 2 (conversion reactor 2), a first cooler 3, a second reactor, and a second cooler 4. The first reactor 2 produces a first reaction product gas by a reaction between silicon tetrachloride ($SiCl_4$) and hydrogen that are raw materials. The first cooler 3 cools the first reaction product gas that is discharged from the first reactor 2. The second reactor maintains the first reaction product gas, which has been subjected to first cooling, in a second temperature range, which is equal to or higher than 600° C. and equal to or lower than 950° C., during a time that is equal to or more than 0.01 sec and equal to or less than 5 sec. The second cooler 4 cools a second reaction product gas, which has flown out from the second reactor, to a temperature lower than 600° C. The first cooler 3 is also used as a second reactor.

The apparatus 1 for manufacturing trichlorosilane includes a gas supply mechanism 5, a supply mechanism 6, a supply mechanism 7, and a distillation device 8. The gas supply mechanism 5 supplies a feed gas, which is formed of silicon tetrachloride and hydrogen that are raw materials, to the first reactor 2 (conversion reactor). The supply mechanism 6 mixes at least one of silicon tetrachloride and hydrogen with the first reaction product gas of the first cooler 3. The supply mechanism 7 mixes hydrogen chloride with the second reaction product gas in a temperature range that is equal to or higher than 350° C. in the second cooler 4. The distillation device 8 condenses and collects trichlorosilane from the second reaction product gas that is discharged from the second cooler 4.

Since the first reactor 2 includes heating device (not shown), the first reactor requires heat resistance against high temperature that is equal to or higher than 1000° C. and equal to or lower than 1900° C. Accordingly, the first reactor is made of a carbon material, and a coating made of silicon carbide (SiC) is preferably formed on the surface of the carbon material in terms of the prevention of the deterioration of the carbon material and the improvement of heat resistance.

The first cooler 3 includes cooling water pipes 3a, and is a water-cooling type cooler that cools the first reaction product gas by cooling water. The first cooler is formed so as to be capable of rapidly cooling the first reaction product gas, which is in the first temperature range, to a temperature of 950° C. or lower within 1 sec. The first cooler 3 may use a water-cooling type heat exchanger that has a large heat transfer area for rapidly cooling the first reaction product gas. For example, the height of the cooler is set to be large, and a second reactor (maintaining part) may be formed on the downstream portion of the cooler. The second reactor maintains a cooling temperature in the second temperature range, which is equal to or higher than 600° C. and equal to or lower than 950° C., during a time that is equal to or more than 0.01 sec and equal to or less than 5 sec.

The supply mechanism 5 includes a pipe 5a through which raw material gases are introduced to the first reactor 2, and a carbon heater 9 that heats a feed gas and is provided on the pipe 5a. Further, the supply mechanism 6 includes a pipe 6a through which at least one of silicon tetrachloride and hydrogen is introduced to the first cooling 3 from a supply source (not shown) of at least one of silicon tetrachloride and hydrogen. The supply mechanism 7 includes a pipe 7a through which hydrogen chloride is introduced to the second cooler 4 from a supply source (not shown) of hydrogen chloride.

The raw material gases, which are formed of silicon tetrachloride and hydrogen, are introduced to the first reactor 2 (conversion reactor) from the pipe 5a of the supply mechanism 5. In the first reactor 2, the raw material gases react with each other under a reaction temperature that is equal to or higher than 1000° C. and equal to or lower than 1900° C. (first temperature range). Accordingly, there is produced a first reaction product gas that contains trichlorosilane, dichlorosilylene, hydrogen chloride, and high-order silane compounds (first reaction process).

Then, a first reaction product gas discharged from the first reactor 2 is introduced to the first cooler 3 and cooled to a temperature of 950° C. or lower within 1 sec. However, there is excluded a case where the first reaction product gas is cooled to a temperature lower than 600° C. within 0.01 sec. The decomposition of trichlorosilane and the change of $SiCl_2$ to a polymer are suppressed by rapidly cooling the first reaction product gas to a temperature of 950° C. or lower within 1 sec.

Following the first cooling process, the first reaction product gas is maintained in the second temperature range, which is equal to or higher than 600° C. and equal to or lower than 950° C., during a time that is equal to or more than 0.01 sec and equal to or less than 5 sec. In the second reaction process, a tendency of $SiCl_2$ (dichlorosilylen) to produce trichlorosilane by reacting with HCl is superior to a tendency of $SiCl_2$ to be changed to a polymer. In addition, since a polymer such as $Si_2Cl_6$ (chlorodisilane) also reacts with HCl and is decomposed into trichlorosilane or silicon tetrachloride, the amount of trichlorosilane produced is increased.

After that, the second reaction product gas, which has flown out from the second reaction process, is introduced to the second cooler 4, and the second reaction product gas is cooled to a temperature lower than 600° C. (second cooling process). The cooling rate of the second cooler 4 is set to a cooling rate different from the second reaction process. The second reaction product gas, which has been cooled in the second cooler 4, is sent to the distillation device 8, so that trichlorosilane is condensed and collected.

In the first cooling process, it may be possible to increase the amount of produced trichlorosilane by introducing at least one of silicon tetrachloride and hydrogen to the first reaction product gas. Further, in the second cooling process, a reaction between hydrogen chloride and a polymer is facilitated by mixing hydrogen chloride in the second reaction product gas in a temperature range that is equal to or higher than 350° C., so that a little residual polymer disappears and trichlorosilane, which is one of the products of decomposition, is produced. As a result, it may be possible to increase the amount of trichlorosilane produced.

Figure 4:
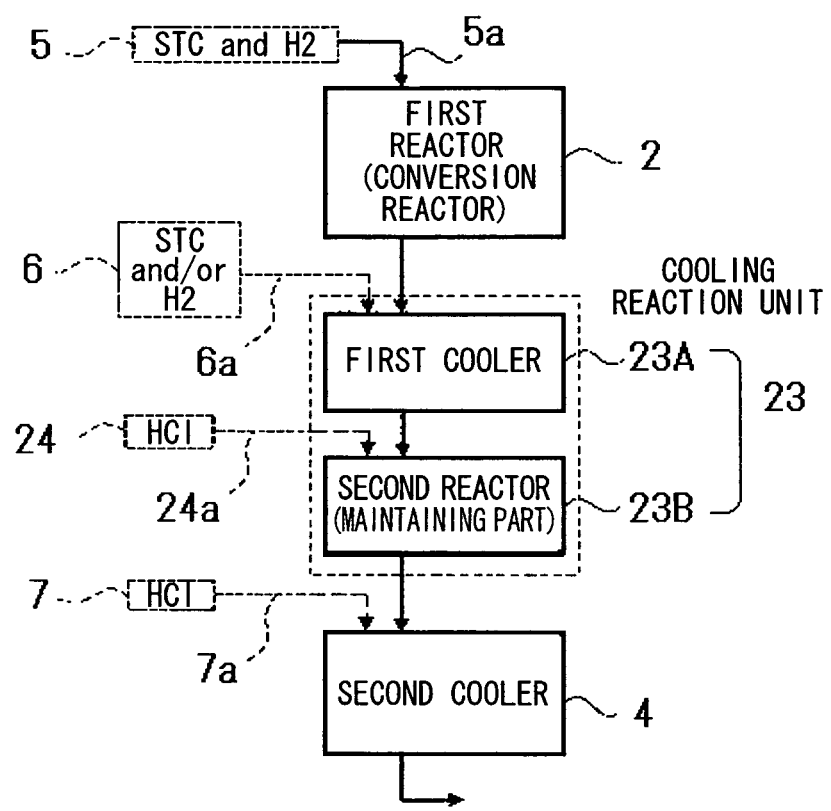
FIG. 4 is a view showing the configuration of main parts of a second embodiment according to the present invention.

Next, a second embodiment of the present invention is shown in FIG. 4. Meanwhile, in the following description, the same components as those of the above-mentioned embodiment are denoted by the same reference numerals and the description thereof will be omitted.

The second embodiment includes a first cooler 23A and a second reactor 23B (maintaining part 23B) in a cooling reaction unit 23, and a mechanism 24 that introduces hydrogen chloride to the second reactor 23B. The first cooler 23A cools the first reaction product gas to a temperature of 950° C. or lower within 1 sec, and the second reactor 23B maintains the temperature of the cooled first reaction product gas to the second temperature range during the time that is equal to or more than 0.01 sec and equal to or less than 5 sec. The introduction mechanism 24 includes a supply source (not shown) of hydrogen chloride, and a pipe 24a through which hydrogen chloride is introduced to the second reactor 23B from the supply source.

According to the second embodiment, after the first reaction product gas is cooled to a temperature of 950° C. or lower within 1 sec by the first cooler 23A, the cooled first reaction product gas is introduced to the second reactor 23B and is maintained in the second temperature range during the time that is equal to or more than 0.01 sec and equal to or less than 5 sec. The decomposition reaction of a polymer is sufficiently performed by the second reaction process. In addition, in the second reaction process, a reaction between hydrogen chloride and a polymer is performed by mixing hydrogen chloride in the first reaction product gas, so that a polymer disappears and trichlorosilane, which is one of decomposition products, is produced. As a result, it may be possible to increase the amount of trichlorosilane produced.

Meanwhile, the decomposition of trichlorosilane (reverse reaction) hardly occurs in the temperature range after the second reaction process. For this reason, even though hydrogen chloride is added in this temperature range, trichlorosilane is not substantially decomposed and the amount of trichlorosilane produced is not reduced. Meanwhile, if hydrogen chloride is added in the temperature range before the second reaction process, an effect for suppressing the decomposition of trichlorosilane is small in a temperature range higher than the second temperature range and the decomposition of trichlorosilane occurs. Accordingly, this is not preferable.

Figure 5:
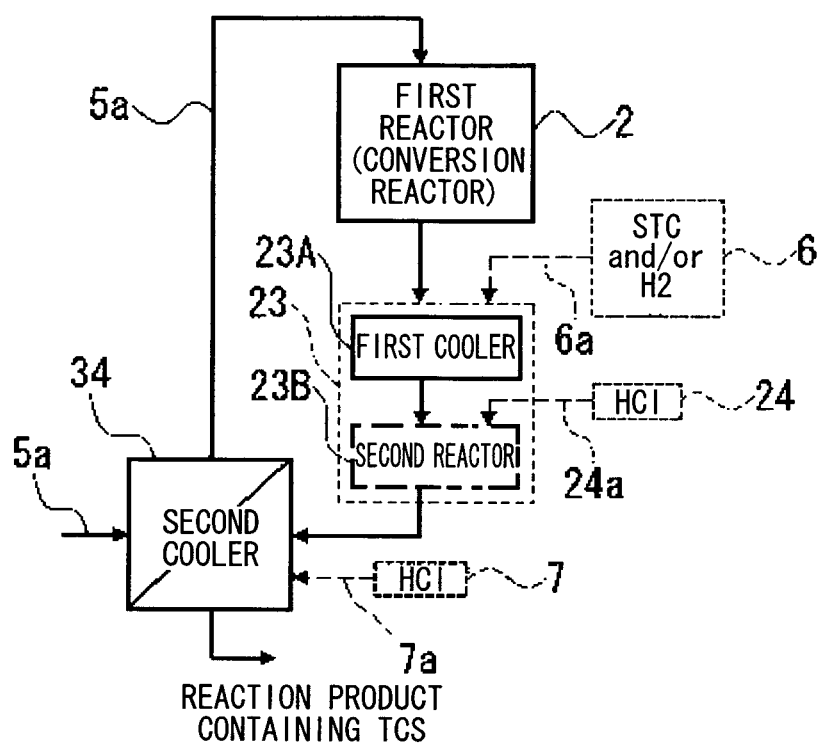
FIG. 5 is a view showing the configuration of main parts of a third embodiment according to the present invention.

Next, a third embodiment of the present invention is shown in FIG. 5. In the third embodiment, as shown in FIG. 5, a heat exchanger, which performs heat exchange between the second reaction product gas and at least one of silicon tetrachloride and hydrogen that are raw materials, is used as a second cooler 34. In the embodiment shown in FIG. 5, both silicon tetrachloride and hydrogen, which are raw materials, are introduced to the second cooler 34 and heat is exchanged between the silicon tetrachloride and hydrogen and the second reaction product gas.

Specifically, in an apparatus for manufacturing trichlorosilane according to the third embodiment shown in FIG. 5, a pipe 5a of a supply mechanism 5 for a raw material gas is connected to a first reactor 2 through the second cooler 34. The first reaction product gas, which has flown out from the first reactor 2 (conversion reactor 2), is introduced to a first cooler 23A and rapidly cooled to a temperature of 950° C. or lower within 1 sec. Then, the first reaction product gas is introduced to a second reactor 23B and maintained in a second temperature range during the time that is equal to or more than 0.01 sec and equal to or less than 5 sec. The second reaction product gas, which has flown out from the second reactor 23B, is introduced to the second cooler 34, and heat exchange is performed between the second reaction product gas and raw material gases. Accordingly, the second reaction product gas is cooled to a temperature lower than 600° C., and the raw material gases (silicon tetrachloride and hydrogen) are preheated.

As described above, in the third embodiment, heat exchange using silicon tetrachloride and hydrogen, which are raw materials, is performed in the second cooling process. Accordingly, it may be possible to recover heat through preheating the raw materials and to reduce energy consumption.

Figure 6:
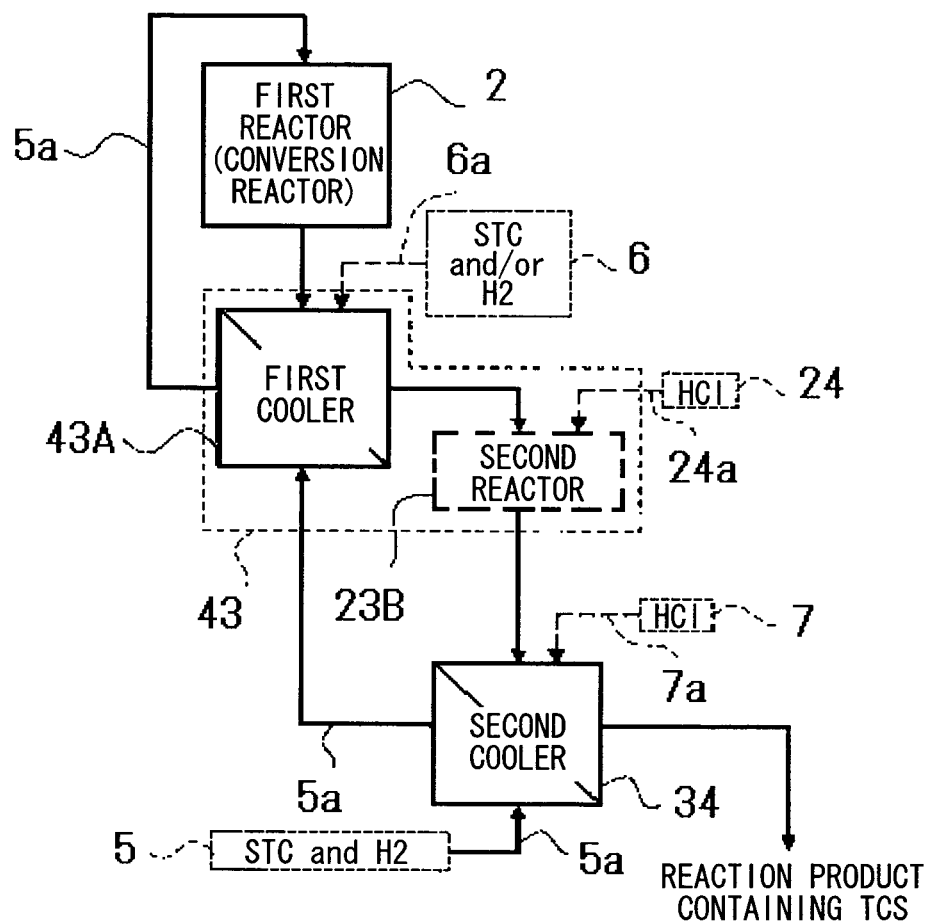
FIG. 6 is a view showing the configuration of main parts of a fourth embodiment according to the present invention.

Next, a fourth embodiment of the present invention is shown in FIG. 6. In the fourth embodiment, heat exchange using raw material gases (silicon tetrachloride and hydrogen) is performed in two stages as shown in FIG. 6. That is, a cooling reaction unit 43 connected to a first reactor 2 is provided with a first cooler 43A and a second reactor 23B, a second cooler 34 is connected to the second reactor 23B, and heat exchangers are used in the first cooler 43A and the second cooler 34.

A second reaction product gas, which has flown out from the second reactor 23B, is introduced to the second cooler 34. Raw material gases (silicon tetrachloride and hydrogen) are introduced to the second cooler 34, and heat exchange is performed between the second reaction product gas and the raw material gases. Accordingly, the second reaction product gas is cooled to a temperature lower than 600° C., and the raw material gases (silicon tetrachloride and hydrogen) are preheated.

The raw material gases, which have performed heat exchange in the second cooler 34, are introduced to the first cooler 43A from the second cooler 34. A first reaction product gas is introduced to the first cooler 43A from the first reactor 2 (conversion reactor 2), so that heat exchange is performed between the first reaction product gas and the raw material gases. Accordingly, the first reaction product gas is cooled to a temperature of 950° C. or lower within 1 sec.

As described above, in the third and fourth embodiments, the cooling of the reaction product gas and the preheating of the raw material gases are simultaneously performed by performing heat exchange between the reaction product gas and the raw material gases (silicon tetrachloride and hydrogen). Accordingly, thermal efficiency is improved. Further, in comparison with the third embodiment, in the fourth embodiment, it may be possible to further recover heat through the preheating of the raw materials and to further reduce energy consumption.

Meanwhile, the technical scope of the present invention is not limited to the above-mentioned embodiments. Various modifications may be made to the present invention without departing from the scope of the present invention. For example, in the fourth embodiment, silicon tetrachloride and hydrogen, which are raw materials, are preheated in two stages in two heat exchangers that are the cooler 34 and the cooling unit 43A. However, although a preheating effect deteriorates in comparison with this case, the heat exchange of silicon tetrachloride and hydrogen that are raw materials may be performed in only in the cooling unit 43A.

Further, in the apparatus and method for manufacturing trichlorosilane according to the present invention, a thermocouple, which is protected by a sheath pipe or the like made of SiC-coated carbon or SiC, may be provided at the center of a gas flow passage of an outlet of each of the first reactor, the first cooler, the second reactor, and the second cooler, gas temperature may be measured, and temperature may be controlled in an objective temperature range. It may be possible to control the cooling rate by the time change of gas temperature that is calculated from the amount of the raw material gas supplied per unit time, the capacity of the heat exchanger (the amount of exchanged heat), and the volume of the heat exchanger. Further, when $SiCl_4$, $H_2$, and HCl are introduced in the first and second cooling processes, it may be possible to control the cooling rate and a reaching temperature by adjusting the temperature of these gases and the amount of introduced gases. Furthermore, it may be possible to control both the heat exchanger and the introduction of the gas.

Next, examples of the apparatus and method for manufacturing trichlorosilane according to the present invention will be specifically described with reference to FIGS. 7 and 8.

Trichlorosilane was manufactured in the condition of production shown in the following Table 1 and FIG. 7 by using the apparatus and method for manufacturing trichlorosilane according to the embodiment shown in FIG. 4. The amount of produced trichlorosilane and the amount of a produced polymer are shown in FIG. 8. Meanwhile, comparative examples, which have been manufactured in conditions outside of the second temperature range and of the cooling time of the present invention, are shown in Table 1, and FIGS. 7 and 8.

Figure 7:
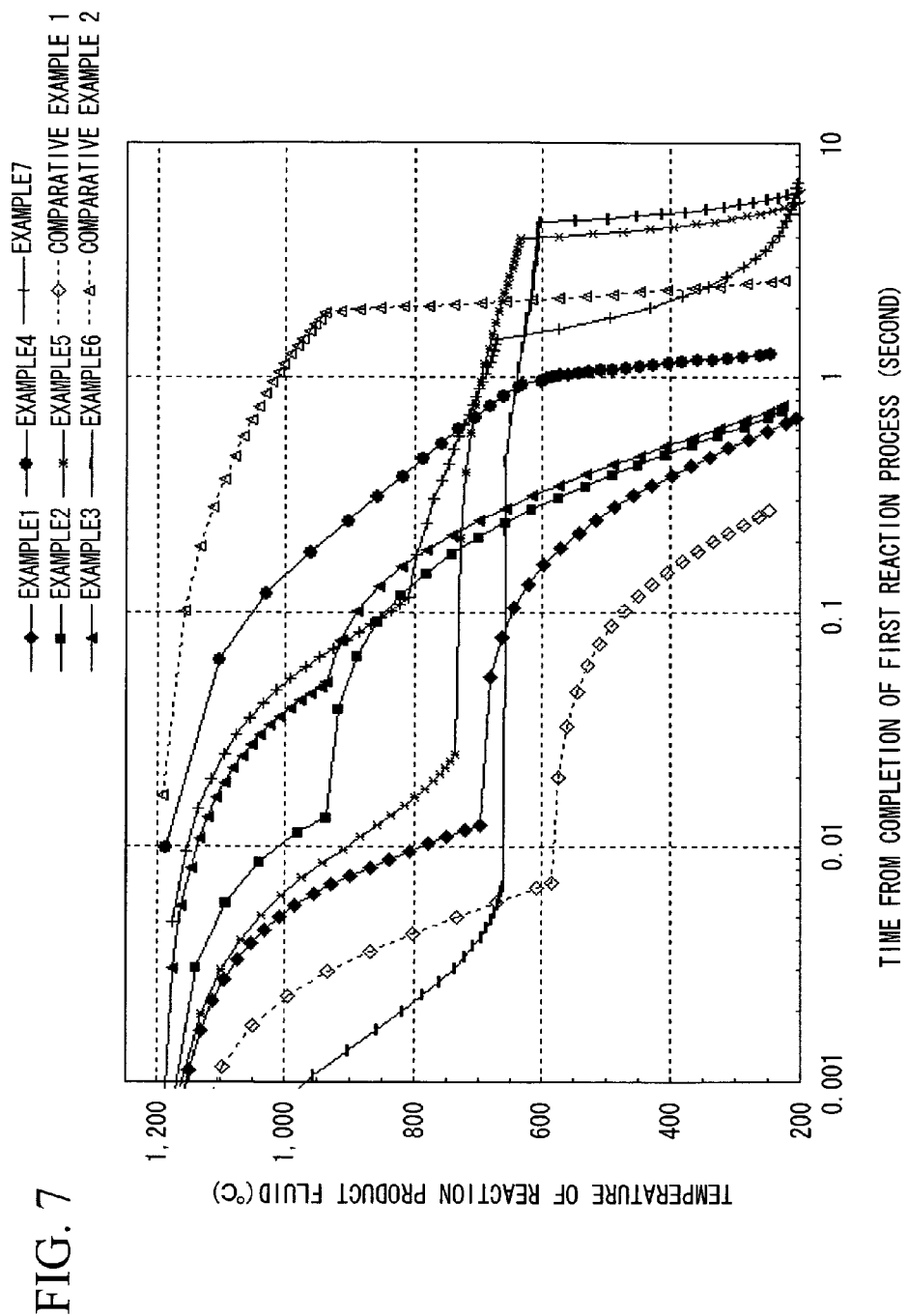
FIG. 7 is a graph showing the temperature of a reaction product fluid with respect to cooling time in examples of the present invention.

FIG. 7 shows the temperature of a reaction product fluid with respect to cooling time after the first reaction process is completed. While the temperature of the first reaction process is set to 1200° C. and the conditions of the reaching temperature and the reaching time (cooling time) of the first cooling process, the maintaining time of the second reaction process, and the average cooling time of the second cooling process are changed as shown in Table 1, and trichlorosilane was manufactured. The results thereof are shown in FIG. 7.

In Example 4, the first reaction product gas of 1200° C. is cooled to a temperature of about 950° C. within about 0.5 sec, is further cooled to about 650° C. for about 0.9 sec, and is then cooled to 250° C. with a changed cooling rate after being maintained for about 0.1 sec in a temperature range that is equal to or higher than about 600° C. and equal to or lower than 650° C.

In Example 5, the first reaction product gas of 1200° C. is cooled to about 740° C. within about 0.025 sec, is further cooled to 600° C. for about 0.05 sec with a changed cooling rate after being maintained for about 4 sec in a temperature range that is equal to or higher than about 640° C. and equal to or lower than 740° C., and is then cooled to 200° C.

In Example 6, the first reaction product gas of 1200° C. is cooled to about 660° C. within about 0.007 sec, and is then cooled to 200° C. with a changed cooling rate after being

TABLE 1

| | TEMPERATURE OF FIRST REACTION PROCESS | FIRST COOLING PROCESS | | MAINTAINING TIME OF SECOND REACTION PROCESS | AVERAGE COOLING RATE OF SECOND COOLING PROCESS |
|---|---|---|---|---|---|
| | | REACHING TEMPERATURE | REACHING TIME | | |
| EXAMPLE 1 | 1200° C. | 699° C. | 0.013 sec | 0.25 sec | 740° C./sec |
| EXAMPLE 2 | 1200° C. | 938° C. | 0.014 sec | 0.30 sec | 990° C./sec |
| EXAMPLE 3 | 1200° C. | 937° C. | 0.050 sec | 0.35 sec | 990° C./sec |
| EXAMPLE 4 | 1200° C. | 600° C. | 1.0 sec | 0.10 sec | 1160° C./sec |
| EXAMPLE 5 | 1200° C. | 740° C. | 0.025 sec | 4.05 sec | — |
| EXAMPLE 6 | 1200° C. | 660° C. | 0.007 sec | 4.7 sec | — |
| EXAMPLE 7 | 1200° C. | 810° C. | 0.12 sec | 1.37 sec | — |
| COMPARATIVE EXAMPLE 1 | 1200° C. | 609° C. | 0.007 sec | — | 1270° C./sec |
| COMPARATIVE EXAMPLE 2 | 1200° C. | 939° C. | 1.80 sec | — | 990° C./sec |

(Note)
The maintaining time of the second reaction process is a maintaining time in the range that is equal to or higher than 600° C. and equal to or lower than 950° C.

As shown in FIG. 7, in Example 1 of the present invention, the first reaction product gas of 1200° C. is cooled to about 700° C. during the time that slightly exceeds 0.01 sec, and is then cooled to 600° C. for about 0.2 sec with a changed cooling rate after being maintained for about 0.05 sec in a temperature range that is equal to or higher than about 650° C. and equal to or lower than 700° C. That is, after being maintained for total 0.25 sec in the second temperature range, the first reaction product gas is cooled to 200° C.

In Example 2, the first reaction product gas of 1200° C. is cooled to a temperature of about 950° C. during the time that slightly exceeds 0.01 sec, and is then cooled to 600° C. with a changed cooling rate after being maintained for about 0.03 sec in a temperature range that is equal to or higher than about 900° C. and equal to or lower than 950° C. That is, after being maintained for total 0.3 sec in the second temperature range, the first reaction product gas is cooled to 200° C.

In Example 3, the first reaction product gas of 1200° C. is cooled to a temperature of about 950° C. within about 0.05 sec, and is then cooled to 600° C. with a changed cooling rate after being maintained for about 0.02 sec in a temperature range that is equal to or higher than about 900° C. and equal to or lower than 950° C. That is, after being maintained for total 0.35 sec in the second temperature range, the first reaction product gas is cooled to 200° C.

maintained for about 4.7 sec in a temperature range that is equal to or higher than about 610° C. and equal to or lower than 660° C.

In Example 7, the first reaction product gas of 1200° C. is cooled to about 810° C. within about 0.12 sec, is further cooled to 600° C. for about 0.07 sec with a changed cooling rate after being maintained for about 1.3 sec in a temperature range that is equal to or higher than about 670° C. and equal to or lower than 810° C., and is then cooled to 200° C.

In Comparative Example 1, the first reaction product gas of 1200° C. is cooled to 600° C. within about 0.007 sec. Accordingly, the first reaction product gas is rapidly cooled at a cooling rate that is higher than the cooling rate of the first cooling process of the present invention. Meanwhile, in Comparative Example 2, about 2 sec is required to cool the first reaction product gas of 1200° C. to about 900° C. Accordingly, the cooling rate is lower than the cooling rate of the first cooling process of the present invention. Further, Comparative Examples 1 and 2 do not include a second reaction process for maintaining the temperature of a reaction product gas for a predetermined time in a temperature range that is equal to or higher than about 600° C. and equal to or lower than 950° C.

Figure 8:
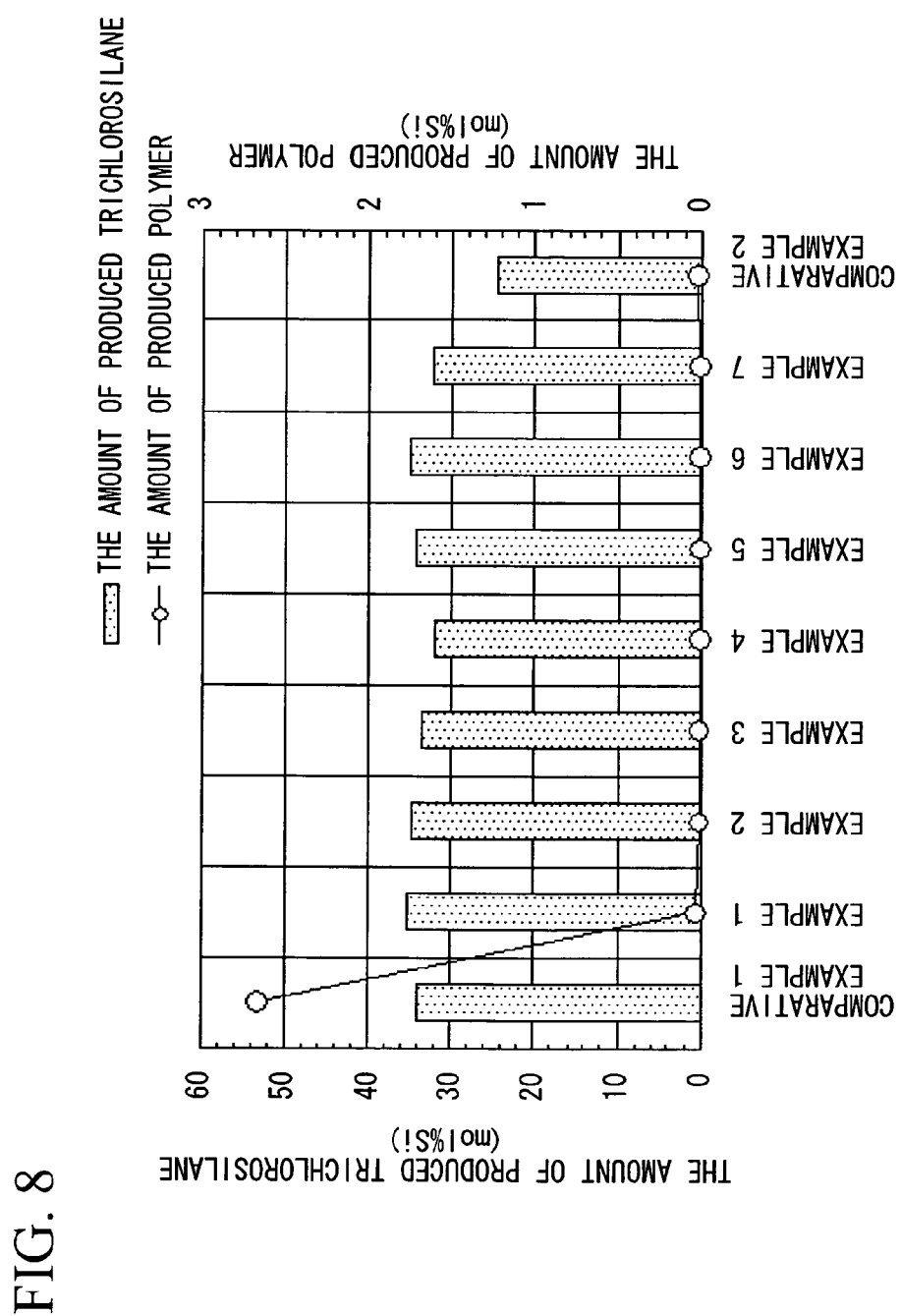
FIG. 8 is a graph showing the amount of produced trichlorosilane and the amount of a produced polymer in the examples.

As understood from FIG. 8, the amount of a produced polymer of each of Examples 1 to 7 of the present invention is smaller than that of Comparative Example 1, and the amount of produced trichlorosilane of each of Examples 1 to 7 is larger than that of Comparative Example 2. That is, the reason for this is considered as follows: since the reaction product gas is rapidly cooled to 600° C. in a short time in Comparative Example 1 and Comparative Example 1 does not include a second reaction process, a tendency of $SiCl_2$ of the reaction product gas to become a polymer is superior to a tendency of $SiCl_2$ to be changed to trichlorosilane. As a result, a large amount of a polymer is produced. Further, in Comparative Example 2, a polymer has not been produced since the cooling time of the first cooling process is long. However, it is considered as follows: since trichlorosilane and hydrogen chloride react with each other, silicon tetrachloride is produced. As a result, the amount of produced trichlorosilane is reduced. Meanwhile, in the present invention, it may be possible to obtain a large amount of produced trichlorosilane and a significant effect in suppressing the production of a polymer.

INDUSTRIAL APPLICABILITY

According to the apparatus and method for manufacturing trichlorosilane of the present invention, since a reverse reaction of a conversion reaction is suppressed by a first cooling process and a second reaction process, it may be possible to produce trichlorosilane from $SiCl_2$ and to decompose high-order silane compounds. Accordingly, the reverse reaction of the conversion reaction and the production of a polymer as a by-product are suppressed, so that it may be possible to increase the amount of produced trichlorosilane and to obtain trichlorosilane at a high conversion ratio. Further, since a second reaction product gas to be finally obtained does not substantially contain a polymer, it may be possible to reduce a problem that materials are attached to a pipe and to maintain the soundness of an apparatus.

The invention claimed is:

1. A method for manufacturing trichlorosilane comprising:
   in a first reaction process producing a first reaction product gas, which contains trichlorosilane, dichlorosilylene, hydrogen chloride, and high-order silane compounds, by performing a conversion reaction of silicon tetrachloride and hydrogen, in a first temperature range which is equal to or higher than 1000° C. and equal to or lower than 1900° C. in a conversion reactor;
   in a first cooling process, cooling the first reaction product gas discharged from the conversion reactor to a temperature equal to or higher than 660° C. and equal to or lower than 950° C. within 1 sec in a first cooler;
   in a second reaction process, maintaining the cooled first reaction product gas discharged from the first cooler in a second temperature range, which is equal to or higher than 600° C. and lower than 950° C., during the time that is equal to or more than 0.1 sec and equal to or less than 5 sec in a second reactor, without re-heating; and
   in a second cooling process, cooling a second reaction product gas discharged from the second reactor, a temperature of the second reaction product gas is controlled to a temperature lower than 600° C. in a second cooler,
   wherein
   in the second reaction process, $SiCl_2$ reacts with HCl to produce trichlorosilane instead of becoming a polymer, and a polymer produced as a by-product in the conversion reaction and a polymer produced during the first cooling process are decomposed into trichlorosilane or silicon tetrachloride,
   in the second cooling process, hydrogen chloride is introduced into the second cooler, while the second reaction product gas is at a temperature range of equal to or higher than 350° C.,
   a combination of the first cooling process and the second reaction process is selected from a group consisting of:
   a) in the first cooling process, cooling the first reaction product gas of 1200° C. to 740° C. within 0.025 sec timed after completion of the first reaction process, and in the second reaction process, maintaining the cooled first reaction product gas in the second temperature range of equal to or higher than 640° C. and equal to or lower than 740° C. for 4 sec;
   b) in the first cooling process, cooling the first reaction product gas of 1200° C. to 660° C. within 0.007 sec timed after completion of the first reaction process, and in the second reaction process, maintaining the cooled first reaction product gas in the second temperature range of equal to or higher than 610° C. and equal to or lower than 660° C. for 4.7 sec;
   c) in the first cooling process, cooling the first reaction product gas of 1200° C. to 810° C. within 0.12 sec timed after completion of the first reaction process, and in the second reaction process, maintaining the cooled first reaction product gas in the second temperature range of equal to or higher than 670° C. and equal to or lower than 810° C. for 1.3 sec.

2. The method according to claim 1, wherein in the first cooling process, at least one of silicon tetrachloride and hydrogen is mixed with the first reaction product gas.

3. The method according to claim 1, wherein in the second reaction process, hydrogen chloride is mixed with the first reaction product gas.

4. The method according to claim 1, wherein in at least one of the first cooling process, the second reaction process, and the second cooling process, cooling is performed by heat exchange using at least one of silicon tetrachloride and hydrogen which are raw materials for producing trichlorosilane.

5. A method of manufacturing polycrystalline silicon comprising:
   i) manufacturing trichlorosilane by the steps comprising:
   in a first reaction process producing a first reaction product gas, which contains trichlorosilane, dichlorosilylene, hydrogen chloride, and high-order silane compounds, by performing a conversion reaction of silicon tetrachloride and hydrogen, in a first temperature range which is equal to or higher than 1000° C. and equal to or lower than 1900° C. in a conversion reactor;
   in a first cooling process, cooling the first reaction product gas discharged from the conversion reactor to a temperature equal to or higher than 660° C. and equal to or lower than 950° C. within 1 sec in a first cooler;
   in a second reaction process, maintaining the cooled first reaction product gas discharged from the first cooler in a second temperature range, which is equal to or higher than 600° C. and lower than 950° C., during the time that is equal to or more than 0.1 sec and equal to or less than 5 sec in a second reactor, without re-heating; and
   in a second cooling process, cooling a second reaction product gas discharged from the second reactor, a temperature of the second reaction product gas is controlled to a temperature lower than 600° C. in a second cooler,
   wherein
   in the second reaction process, $SiCl_2$ reacts with HCl to produce trichlorosilane instead of becoming a polymer, and a polymer produced as a by-product in the conversion reaction and a polymer produced during the first cooling process are decomposed into trichlorosilane or silicon tetrachloride, in the second cooling process, hydrogen chloride is introduced into the second cooler, while the second reaction product gas is at a temperature range of equal to or higher than 350° C., a combination of the first cooling process and the second reaction process is selected from a group consisting of:
- a) in the first cooling process, cooling the first reaction product gas of 1200° C. to 740° C. within 0.025 sec timed after completion of the first reaction process, and in the second reaction process, maintaining the cooled first reaction product gas in the second temperature range of equal to or higher than 640° C. and equal to or lower than 740° C. for 4 sec;
- b) in the first cooling process, cooling the first reaction product gas of 1200° C. to 660° C. within 0.007 sec timed after completion of the first reaction process, and in the second reaction process, maintaining the cooled first reaction product gas in the second temperature range of equal to or higher than 610° C. and equal to or lower than 660° C. for 4.7 sec;
- c) in the first cooling process, cooling the first reaction product gas of 1200° C. to 810° C. within 0.12 sec timed after completion of the first reaction process, and in the second reaction process, maintaining the cooled first reaction product gas in the second temperature range of equal to or higher than 670° C. and equal to or lower than 810° C. for 1.3 sec; and ii) introducing trichlorosilane obtained after the second cooling process to a reaction apparatus that manufactures polycrystalline silicon to produce polycrystalline silicon.

6. The method according to claim 1, wherein the first cooler has a first supply mechanism supplying at least one of silicon tetrachloride and hydrogen to the first cooler and the second reactor has a second supply mechanism supplying hydrogen chloride to the second reactor.

7. The method according to claim 5, wherein the first cooler has a first supply mechanism supplying at least one of silicon tetrachloride and hydrogen to the first cooler and the second reactor has a second supply mechanism supplying hydrogen chloride to the second reactor.

* * * * *